(12) United States Patent
Tamanaha et al.

(10) Patent No.: US 11,856,335 B2
(45) Date of Patent: Dec. 26, 2023

(54) COMMUNICATION SYSTEM AND COMMUNICATION METHOD

(71) Applicant: HONDA MOTOR CO., LTD., Tokyo (JP)

(72) Inventors: Ryusuke Tamanaha, Tokyo (JP); Tatsuya Kyomitsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/941,322

(22) Filed: Sep. 9, 2022

(65) Prior Publication Data

US 2023/0087901 A1 Mar. 23, 2023

(30) Foreign Application Priority Data

Sep. 15, 2021 (JP) .................................. 2021-150289

(51) Int. Cl.
| | |
|---|---|
| *H04N 7/18* | (2006.01) |
| *G01P 3/00* | (2006.01) |
| *H04N 5/77* | (2006.01) |
| *H04W 40/22* | (2009.01) |

(52) U.S. Cl.
CPC ............... *H04N 7/188* (2013.01); *G01P 3/00* (2013.01); *H04N 5/77* (2013.01); *H04N 7/183* (2013.01); *H04W 40/22* (2013.01)

(58) Field of Classification Search
None
See application file for complete search history.

(56) References Cited

U.S. PATENT DOCUMENTS

2021/0029385 A1* 1/2021 Lee .......................... B62J 50/40

FOREIGN PATENT DOCUMENTS

JP 2020-177677 10/2020

* cited by examiner

*Primary Examiner* — Hung Q Dang
(74) *Attorney, Agent, or Firm* — Rankin, Hill & Clark LLP

(57) ABSTRACT

Provided is a communication system including: an external communication unit configured to perform communication with an external communication device via a first communication network; a communication relay unit configured to perform communication with a mobile communication terminal via a second communication network to relay communication between the mobile communication terminal and the external communication device via the first communication network and the second communication network; and a communication control unit configured to execute captured image transmission processing for transmitting a captured image acquired by a camera to the external communication device by the external communication unit, and to execute mobile body relay processing for performing communication between the mobile communication terminal and the external communication device by the communication relay unit.

13 Claims, 5 Drawing Sheets

FIG.4

| SPEED RANGE | V>Vth | | V≦Vth | |
|---|---|---|---|---|
| RADIO-WAVE STRENGTH RANGE | E>Eth | E≦Eth | E>Eth | E≦Eth |
| CONDITION NAME | CONDITION A | CONDITION B | CONDITION C | CONDITION D |
| COMMUNICATION STABILITY | MEDIUM | LOWEST | HIGH | LOW |
| IN-VEHICLE Wi-Fi RELAY | 50%(−α) | 90%(−α) | 40%(−α) | 70%(−α) |
| CAPTURED IMAGE TRANSMISSION | 50%(+α) | 10%(+α) | 60%(+α) | 30%(+α) |

COMMUNICATION SYSTEM AND COMMUNICATION METHOD

INCORPORATION BY REFERENCE

The present application claims priority under 35 U.S.C. § 119 to Japanese Patent Application No. 2021-150289 filed on Sep. 15, 2021. The content of the application is incorporated herein by reference in its entirety.

BACKGROUND OF THE INVENTION

Field of the Invention

The present invention relates to a communication system and a communication method.

Description of the Related Art

Conventionally, there has been proposed a system configured to transmit captured images acquired by a dashboard camera recorder to an image collection device by providing a function of communicating with the image collection device outside a mobile body to the dashboard camera recorder loaded on the mobile body (for example, see Japanese Patent Laid-Open No. 2020-177677). With this system, the captured images are used for fixed point observation, searching for a lost child, checking the situation at a fire site, and the like other than for detecting an accident.

As described above, in order to collect captured images acquired by the communication system including a camera such as a dashboard camera recorder and use those for various usages, it is necessary to increase the timing for capturing the images by the communication system and transmit as many captured images as possible to the image collection device. Therefore, it is desirable to suppress the communication cost borne by the user when transmitting the captured images from the communication system so that the communication cost does not become an obstacle for transmitting the captured images.

The present invention is designed in view of the aforementioned circumstance, and it is an object thereof to provide a communication system and a communication method capable of reducing the communication cost when transmitting captured images acquired by a mobile body to outside the mobile body.

SUMMARY OF THE INVENTION

As an aspect for achieving the object, there is a communication system including: a camera; an external communication unit configured to perform communication with an external communication device via a first communication network; a communication relay unit configured to perform communication with a mobile communication terminal via a second communication network to relay communication between the mobile communication terminal and the external communication device via the first communication network and the second communication network; and a communication control unit configured to execute captured image transmission processing for transmitting a captured image acquired by the camera to the external communication device by the external communication unit, and to execute mobile body relay processing for performing communication between the mobile communication terminal and the external communication device by the communication relay unit.

The communication system may further include a speed recognition unit configured to recognize a moving speed of a mobile body that uses the communication system, in which the communication control unit determines whether to execute transmission of the captured image by the captured image transmission processing or to execute communication by the mobile body communication relay processing based on the moving speed of the mobile body.

The communication system may further include a speed recognition unit configured to recognize a moving speed of a mobile body that uses the communication system, in which the communication control unit determines a ratio between a communication volume to be allotted to transmission of the captured image by the captured image transmission processing and a communication volume to be allotted to communication by the mobile body communication relay processing based on the moving speed of the mobile body.

In the communication system, the communication control unit may decrease the ratio of the communication volume to be allotted to transmission of the captured image by the captured image transmission processing as the moving speed of the mobile body becomes faster.

In the communication system, the speed recognition unit may recognize the moving speed of the mobile body by acquiring information of the moving speed of the mobile body detected by a speed sensor that is provided in the mobile body.

The communication system may further include a radio-wave strength recognition unit configured to recognize a radio-wave strength in communication performed by the external communication unit via the first communication network, in which the communication control unit determines whether to execute transmission of the captured image by the captured image transmission processing or to execute communication by the mobile body communication relay processing based on the radio-wave strength.

The communication system may further include a radio-wave strength recognition unit configured to recognize a radio-wave strength in communication performed by the external communication unit via the first communication network, in which the communication control unit determines a ratio between a communication volume to be allotted to transmission of the captured image by the captured image transmission processing and a communication volume to be allotted to communication by the mobile body communication relay processing based on the radio-wave strength.

In the communication system, the communication control unit may decrease the ratio of the communication volume to be allotted to transmission of the captured image by the captured image transmission processing as the radio-wave strength becomes weaker.

In the communication system, the external communication unit may perform communication with the external communication device via the first communication network by packet communication, and the communication control unit may packetize data that is a combination of data of the captured image transmitted by the captured image transmission processing and data transmitted by the mobile body communication relay processing, and transmit the packetized data to the external communication device by the packet communication by the external communication unit to execute the captured image transmission processing and the mobile body communication relay processing.

In the communication system, the external communication unit may perform communication with the external communication device via the first communication network by packet communication, and the communication control unit may packetize data that is a combination of data of the captured image transmitted by the captured image transmission processing and data transmitted by the mobile body communication relay processing in accordance with the ratio determined based on the moving speed of the mobile body, and transmit the packetized data to the external communication device by the packet communication by the external communication unit to execute the captured image transmission processing and the mobile body communication relay processing.

In the communication system, the external communication unit may perform communication with the external communication device via the first communication network by packet communication, and the communication control unit may packetize data that is a combination of data of the captured image transmitted by the captured image transmission processing and data transmitted by the mobile body communication relay processing in accordance with the ratio determined based on the radio-wave strength, and transmit the packetized data to the external communication device by the packet communication by the external communication unit to execute the captured image transmission processing and the mobile body communication relay processing.

The communication system may be formed with a dashboard camera recorder that includes the camera configured to capture at least one of surroundings or inside of a mobile body, the dashboard camera recorder being mounted to the mobile body to be used.

As another aspect for achieving the object, there is a communication method to be performed by a computer, the method comprising: transmitting a captured image acquired by a camera to an external communication device by an external communication unit configured to perform communication with the external communication device via a first communication network; and performing communication between a mobile communication terminal and the external communication device by a communication relay unit configured to perform communication with the mobile communication terminal via a second communication network to relay communication between the mobile communication terminal and the external communication device via the first communication network and the second communication network.

According to the communication system, the communication relay unit is provided, and communication between the mobile communication terminal and the external communication device and transmission of the captured image to the external communication device are executed collectively by a single communication grid by the external communication unit. This makes it possible to shrink overhead of communication control data with respect to the information data of the captured image and the like and reduce the communication cost when transmitting the captured image acquired by the mobile body to outside the mobile body.

BRIEF DESCRIPTION OF THE DRAWINGS

FIG. 4 is a settings table of transmission volume ratios in accordance with traveling speed and radio-wave strength.

DETAILED DESCRIPTION OF THE PREFERRED EMBODIMENTS

Figure 1:
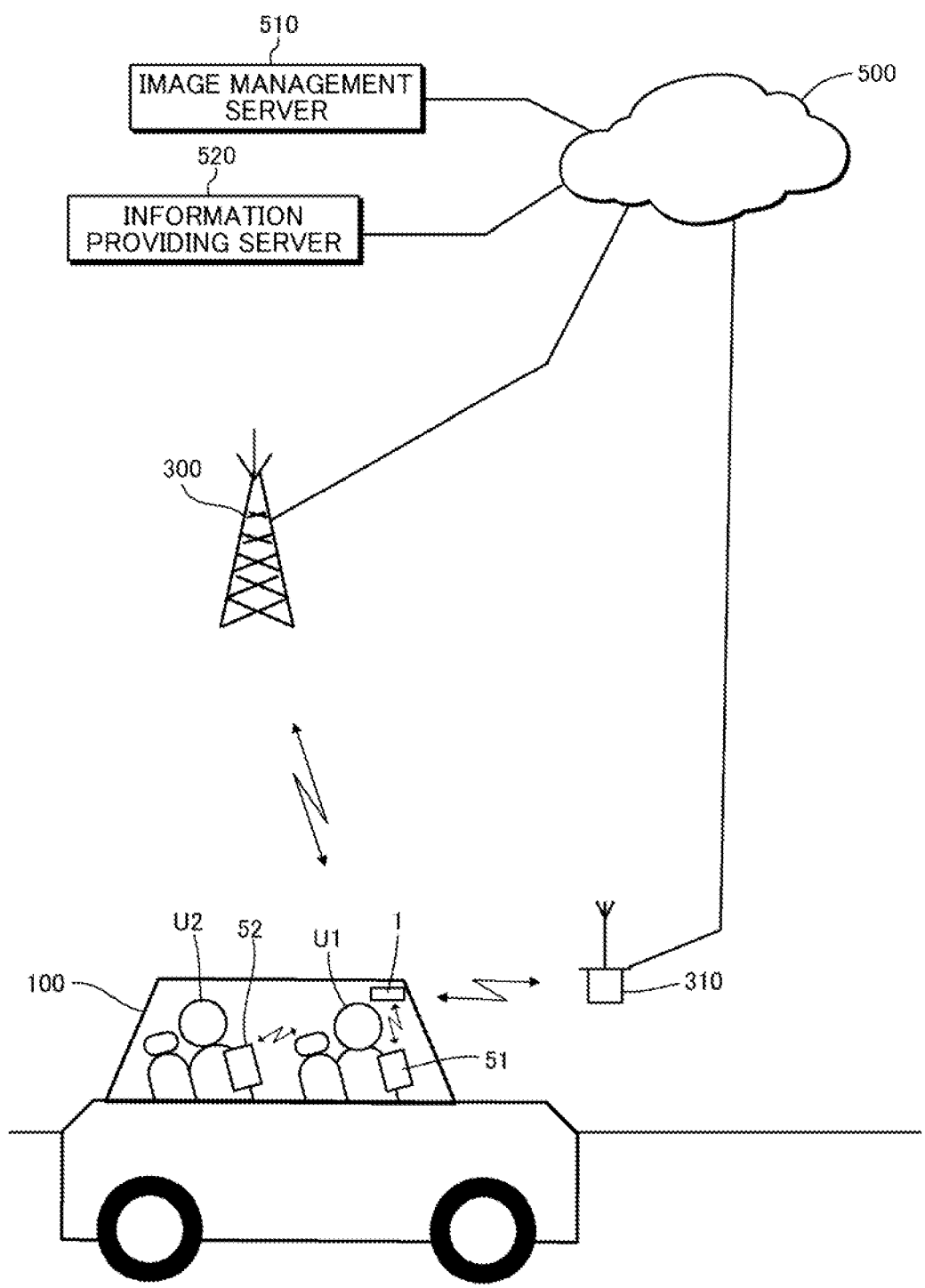
FIG. 1 is an explanatory diagram of a use mode of a dashboard camera recorder.

1. Use Mode of Dashboard Camera Recorder

By referring to FIG. 1, a use mode of a dashboard camera recorder 1 according to an embodiment as an example of a configuration of a communication system of the present disclosure will be described. The dashboard camera recorder 1 is used by being mounted to a vehicle 100, and has a function of capturing images of the surroundings of the vehicle 100 and inside the vehicle 100 by a camera. The vehicle 100 corresponds to a mobile body of the present disclosure.

The dashboard camera recorder 1 has a function of performing cellular communication and Wi-Fi (registered trademark) communication. The dashboard camera recorder 1 performs communication with an external communication device via a wide area network 500 by performing cellular communication with a base station 300 of each cell or by performing Wi-Fi communication with a router 310 placed at a Wi-Fi spot in the vicinity of a road. In FIG. 1, illustrated are an image management server 510 and an information providing server 520 as the external communication devices. The wide area network 500 corresponds to a first communication network of the present disclosure.

Furthermore, the dashboard camera recorder 1 has a function of a Wi-Fi router that establishes Wi-Fi communication with mobile communication terminals 51, 52 that are used by users U1, U2 in the vehicle 100 and implements an in-vehicle Wi-Fi network environment. The in-vehicle Wi-Fi network corresponds to a second communication network of the present disclosure. The mobile communication terminals 51 and 52 are smartphones, mobile phones, tablet terminals, mobile game machines, and the like having a Wi-Fi communication function.

The dashboard camera recorder 1 functions as the Wi-Fi router to enable communication between the mobile communication terminals 51, 52 and the external communication devices such as the image management server 510 and the information providing server 520 via the in-vehicle Wi-Fi network and the wide area network 500. The users U1 and U2 can acquire information by performing communication with the information providing server 520, for example, by using the in-vehicle Wi-Fi environment provided by the dashboard camera recorder 1, even when the mobile communication terminals 51 and 52 do not have the cellular communication function. By the in-vehicle Wi-Fi network environment of the dashboard camera recorder 1, it is also possible to relay and perform communication between the mobile communication terminal outside the vehicle 100 and the external communication device when the vehicle 100 is parked or stopped.

Furthermore, the dashboard camera recorder 1 transmits the captured image acquired by the camera to the image management server 510 via the wide area network 500. The image management server 510 uses the captured image received from the dashboard camera recorder 1 to perform processing such as analysis of an accident, fixed point observation, inspection of road equipment, and the like.

2. Configuration of Dashboard Camera Recorder

By referring to FIG. 2, the configuration of the dashboard camera recorder 1 will be described. The dashboard camera recorder 1 includes a processor 10, a memory 20, a NAD (Network Access Device) 30, an antenna 31, a front camera 32, a rear camera 33, a GNSS (Global Navigation Satellite System) sensor 34, an acceleration sensor 35, a switch 36, and a display 37.

The NAD 30 is a chip in which a cellular communication module and a Wi-Fi communication module are integrated. The antenna 31 is a dual-use antenna corresponding to both cellular communication and Wi-Fi communication. The function of performing communication between the dashboard camera recorder 1 and the external communication device via the wide area network 500 using the NAD 30 and the antenna 31 corresponds to an external communication unit of the present disclosure. Furthermore, the function of the Wi-Fi router for relaying the in-vehicle Wi-Fi and the wide area network using the NAD 30 and the antenna 31 corresponds to a communication relay unit of the present disclosure.

The front camera 32 captures an image of the surroundings in front of the vehicle 100 and outputs the captured image to the processor 10. The rear camera 33 captures an image of the surroundings to the rear of the vehicle 100 and outputs the captured image to the processor 10. In addition to the front camera 32 and the rear camera 33, side cameras for capturing images of side views of the vehicle 100 and an in-vehicle camera for capturing an image inside the vehicle 100 may be provided as well. Furthermore, a configuration having only the front camera 32 is also possible.

The GNSS sensor 34 receives a radio wave from a positioning satellite to detect the current position (latitude, longitude) of the dashboard camera recorder 1, and outputs a position detection signal to the processor 10. The acceleration sensor 35 detects the acceleration generated in the dashboard camera recorder 1, and outputs an acceleration detection signal to the processor 10. The acceleration sensor 35 detects the acceleration of three orthogonal axis directions, for example. The switch 36 outputs operation signals corresponding to operations of the users U1 and U2 to the processor 10. The display 37 displays an operation state and the like of the dashboard camera recorder 1 in accordance with a control input from the processor 10.

The processor 10 functions as an imaging control unit 11, a speed recognition unit 12, a radio-wave strength recognition unit 13, a communication control unit 14, and a timer unit 15 by reading and executing a control program for the dashboard camera recorder 1 saved in the memory 20. The processor 10 corresponds to a computer of this disclosure. The processor 10 executes a communication method of this disclosure.

The imaging control unit 11 captures an image by at least one of the front camera 32 and the rear camera 33 at a prescribed imaging timing, and saves the captured image in the memory. As the imaging timing, following (1) to (3) timings are set, for example.

(1) When Vehicle 100 Encounters Accident

The imaging control unit 11 recognizes that the vehicle 100 encountered an accident by detecting the acceleration in a level of a prescribed threshold or more by the acceleration sensor 35. It is also possible to recognize an accident of the vehicle 100 based on an impact detection signal acquired by an impact sensor provided for an airbag or the like mounted to the vehicle 100.

(2) When Vehicle 100 Travels Through Fixed Point

The imaging control unit 11 recognizes that the vehicle 100 is traveling through a fixed point set in advance from the current position of the dashboard camera recorder 1 detected by the GNSS sensor 34. As the fixed point, a point where a traffic jam is likely to occur, a point where road equipment (road sign, utility pole, or the like) as the target of maintenance is located, a sightseeing spot, or the like may be set.

(3) When Vehicle 100 Travels Through Image Capturing Request Point

The imaging control unit 11 recognizes the image capturing request point by receiving information of the image capturing request point transmitted from the image management server 510, and recognizes that the vehicle 100 is traveling through the image capturing request point from the current position of the dashboard camera recorder 1 detected by the GNSS sensor 34. As the image capturing request point, an accident site of another vehicle, a fire site, a site where a child is lost, or the like is set, for example.

The speed recognition unit 12 recognizes the traveling speed (moving speed) of the vehicle 100 by receiving a speed detection signal Vcar from a car speed sensor provided in the vehicle 100. The dashboard camera recorder 1 receives the speed detection signal Vcar by performing wired or wireless communication with an ECU (Electronic Control Unit) provided in the vehicle 100. The speed recognition unit 12 may recognize the traveling speed (moving speed) of the vehicle 100 by performing prescribed image processing on the captured image. The radio-wave strength recognition unit 13 recognizes the radio-wave strength at the time of accessing the wide area network 500 by cellular or Wi-Fi based on the communication status performed by the NAD 30. As the radio-wave strength, RSSI (Received Signal Strength Indicator) is used, for example.

The speed recognition unit 12 may recognize the traveling speed of the vehicle 100 (a mobile body) by the following method (a) or (b).

(a) The speed recognition unit 12 acquires the traveling speed of one of the mobile communication terminals 51, 52 which communicate with the dashboard camera recorder 1, by arbitrary ways such as using a velocity sensor equipped in the mobile communication terminals 51, 52. And the speed recognition unit 12 recognizes the traveling speed of one of the mobile communication terminals 51, 52 as the traveling speed of the vehicle 100.

(b) The speed recognition unit 12 acquires the traveling speed of the dashboard camera recorder 1 by arbitrary ways such as image data processing for a camera image or using a velocity sensor equipped in the dashboard camera recorder 1. And the speed recognition unit 12 recognizes the traveling speed of the dashboard camera recorder 1 as the traveling speed of the vehicle 100.

The communication control unit 14 executes captured image transmission processing for transmitting the captured image captured and saved in the memory 20 by the imaging control unit 11 to the image management server 510 via the wide area network 500 by the NAD 30. Furthermore, the communication control unit 14 executes in-vehicle Wi-Fi communication processing for executing communication between the mobile communication terminals 51, 52 and the external communication device such as the information providing server 520 by relaying the in-vehicle Wi-Fi network and the wide area network 500 by the NAD 30. The in-vehicle Wi-Fi communication processing corresponds to mobile body communication relay processing of the present disclosure.

The communication control unit 14 packetizes data that is a combination of information data of the in-vehicle Wi-Fi and data of the captured image, and performs communication with the external communication device via the wide area network 500 by packet communication. With this processing, the overhead of control data added to the information data of the captured image and the like transmitted by packet is shrunk and the communication volume is reduced, so that it is possible to reduce the communication cost borne by the users U1 and U2.

The timer unit 15 performs processing for counting the current date and time. The imaging control unit 11 adds information of the date and time that is the imaging time counted by the timer unit 15 to the captured images acquired by the front camera 32 and the rear camera 33, and saves the captured images in the memory 20.

3. Captured Image Transmission Processing and In-Vehicle Wi-Fi Communication Processing According to the flowchart illustrated in FIG. 3, captured image communication processing and in-vehicle Wi-Fi communication processing executed by the communication control unit 14 will be described.

Figure 3:
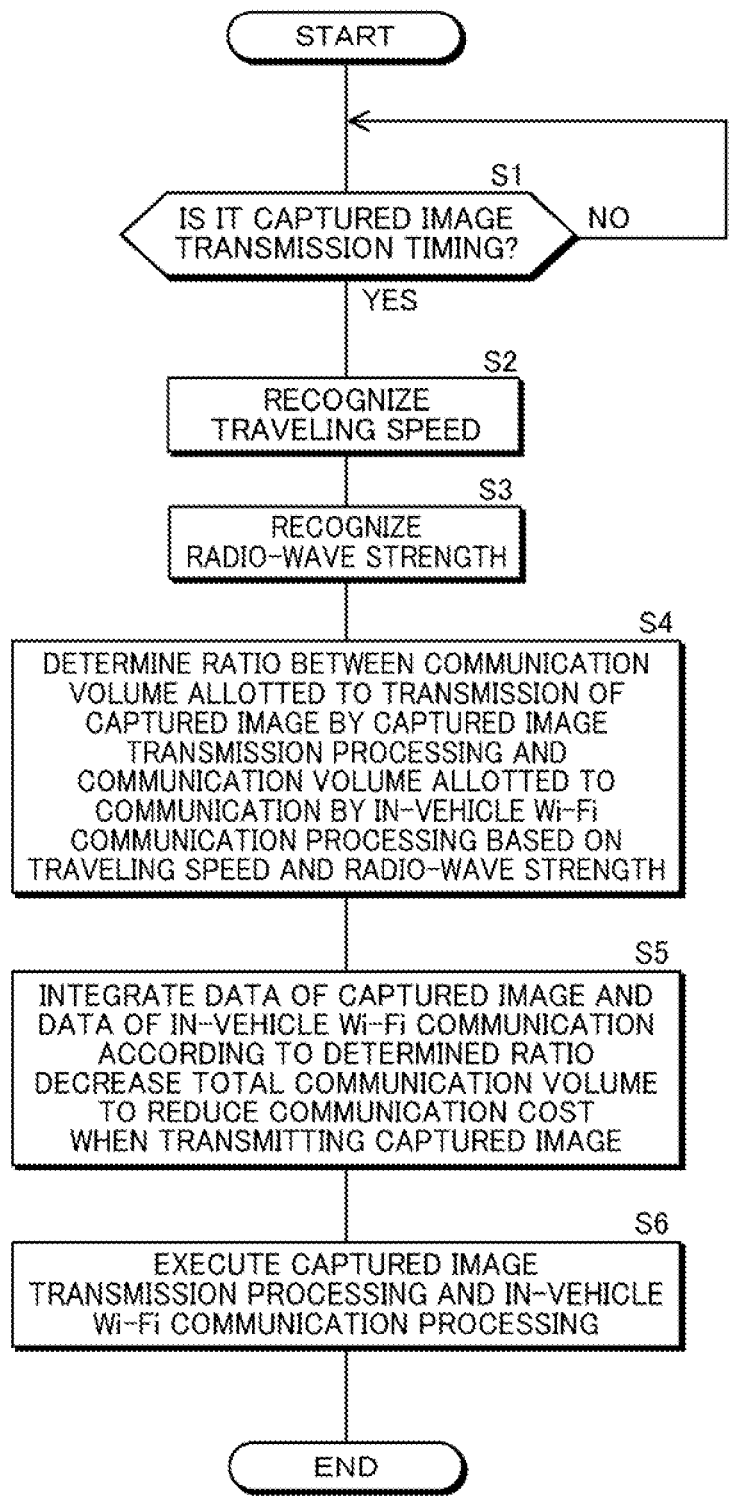
FIG. 3 is a flowchart of transmission of a captured image and communication via in-vehicle Wi-Fi communication.

In Step S1 of FIG. 3, the communication control unit 14 determines whether it is a transmission timing of the captured images, and proceeds the processing to Step S2 when determined that it is the transmission timing of the captured images. The transmission timing of the captured images is when the data amount of the captured images saved in the memory 20 reaches a prescribed amount or more, for example. In the event of an emergency such as when the vehicle 100 encounters an accident, the captured image may immediately be transmitted to the image management server 510.

In Step S2, the speed recognition unit 12 recognizes the traveling speed of the vehicle 100. In subsequent Step S3, the radio-wave strength recognition unit 13 recognizes the radio-wave strength at the time of accessing the wide area network 500. In subsequent Step S4, the communication control unit 14 determines the ratio between the communication volume to be allotted to transmission of the captured images and the communication volume to be allotted to the in-vehicle Wi-Fi communication based on the traveling speed of the vehicle 100 and the radio-wave strength at the time of accessing the wide area network 500. The communication control unit 14 determines the transmission volume to be allotted to transmission of the captured images or the in-vehicle Wi-Fi as zero depending on the traveling speed of the vehicle 100 or the radio-wave strength.

The communication control unit 14 lowers the ratio of the communication volume to be allotted to transmission of the captured images as the traveling speed of the vehicle 100 becomes slower. Furthermore, the communication control unit 14 lowers the ratio of the communication volume to be allotted to transmission of the captured images as the radio-wave strength at the time of accessing the wide area network 500 becomes weaker. This makes it possible to suppress transmission of the captured images and avoid having a transmission error of the captured images when it is in a situation where communication with the wide area network 500 is likely to become unstable because the traveling speed of the vehicle 100 is too fast or the radio-wave strength is too weak.

Here, by referring to a settings table illustrated in FIG. 4, an example of the settings of the ratio between the communication volume to be allotted to transmission of the captured images and the communication volume to be allotted to the in-vehicle Wi-Fi communication will be described. Note that "Vth" in FIG. 4 is a determination threshold of a moving speed V, and "Eth" is a determination threshold of a radio-wave strength E. Furthermore, "α" is a prescribed value for adjustment to be described later.

As can be seen from a comparison between a condition A and a condition C, the communication control unit 14 decreases the ratio of the communication volume to be allotted to transmission of the captured images performed by the captured image transmission processing as the moving speed V of the vehicle 100 becomes faster. Furthermore, as can be seen from a comparison between the condition A and the condition B, the communication control unit 14 decreases the ratio of the communication volume to be allotted to transmission of the captured images performed by the captured image transmission processing as the radio-wave strength E becomes weaker. Moreover, under a situation where the radio-wave strength E is fine and the moving speed V is slow like the condition C, the communication control unit 14 may set the ratio of the communication volume to be allotted to transmission of the captured images performed by the captured image transmission processing to be higher than the ratios for the other conditions.

Note that the numerical values of the ratios in each of the conditions A to D indicated in FIG. 4 are examples.

Under the condition B, for example, the communication volume to be allotted to the in-vehicle Wi-Fi relay communication may be set as 100% and the communication volume to be allotted to transmission of the captured images may be set as 0%. Furthermore, under the condition C, for example, the communication volume to be allotted to the in-vehicle Wi-Fi relay communication may be set as 0% and the communication volume to be allotted to transmission of the captured images may be set as 100%. Note here that to set one of the communication volumes as 100% and the other as 0% is an example of a case where the communication control unit 14 determines whether to perform transmission of the captured images or to perform the in-vehicle Wi-Fi relation communication based on the moving speed of the mobile body and the radio-wave strength.

Setting the ratios of the communication volume to be allotted to transmission of the captured images and the communication volume to be allotted to the in-vehicle Wi-Fi relay communication and determining which communication to perform may be executed based on the data amount of the captured images required to be transmitted to the external device (for example, amount of data accumulated in the memory 20 of the dashboard camera recorder 1, which is referred as transmission required data capacity hereinafter) and the data amount that can be transmitted (referred to as transmittable data capacity hereinafter) while in a communication range of the same base station 300 or the router 310 (see FIG. 1).

Figure 5:
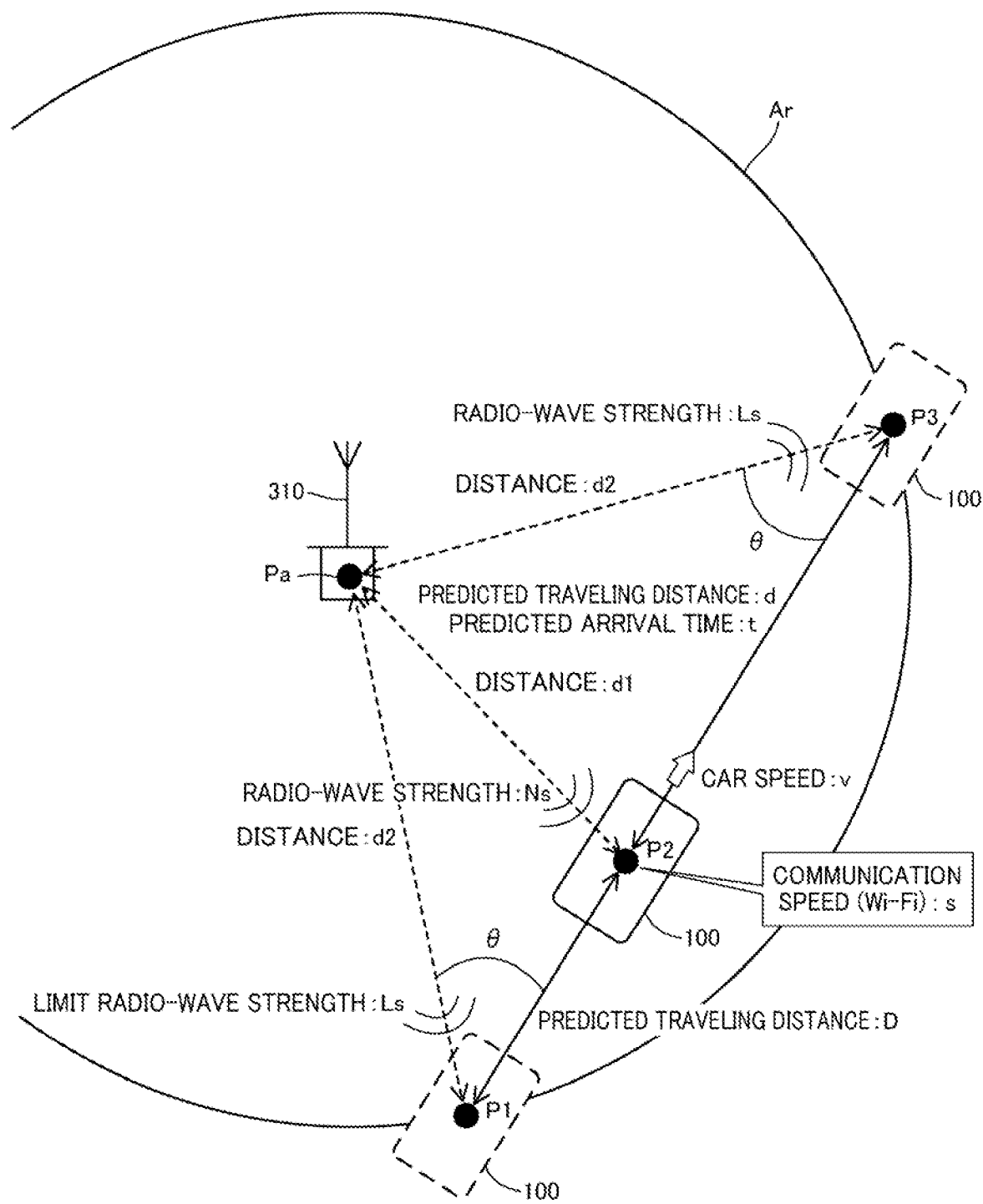
FIG. 5 is a diagram for describing the transmittable data volume while communication between a Wi-Fi spot router and the dashboard camera recorder is being established.

Here, an example of calculation method of the transmittable data capacity will be described by referring to FIG. 5. FIG. 5 indicates a range capable of performing communication between the router 310 at a Wi-Fi spot and the dashboard camera recorder 1 loaded on the vehicle 1 as a circle Ar, and illustrates a situation where the vehicle 100 is traveling within Ar. In FIG. 5, Pa indicates the position of the router 310 at the Wi-Fi spot, P1 indicates the position at which the vehicle 100 enters Ar, P2 indicates the current position of the vehicle 100, P3 indicates the position at which the vehicle 100 leaves Ar. Note that Pa is assumed as the center position of Ar. A triangle formed by connecting Pa, P1, and P3 is an isosceles triangle where the distance between Pa and P1 and the distance between Pa and P3 are both d2.

In the situation of FIG. 5, a transmittable data capacity A while the vehicle 100 travels from P2 to P3 within Ar can be calculated by following formulae (1) to (10).

[Expression 1]

$$A = s \times t \quad (1)$$

where "A" is transmittable data capacity, "s" is communication speed with the Wi-Fi spot router 310, and "t" is estimated time required for the vehicle 100 to reach from P2 to P3.

[Expression 2]

$$d = v \times t \quad (2)$$

where "d" is distance between P2 and P3, and "v" is moving speed of the vehicle 100.

From the law of cosines, a following formula (3) applies.

[Expression 3]

$$d1^2 = d^2 + d2^2 - 2 \times d \times d2 \times \cos\theta \quad (3)$$

where "d1" is distance between Pa and P2, "d2" is distance between Pa and P3, "θ" is direction of radio wave from the router 310 at P1, P3 toward the vehicle 100.

Note that "d2×cos θ" can be calculated by a following formula 4.

[Expression 4]

$$d2 \times \cos\theta = \frac{D+d}{2} \quad (4)$$

where "D" is distance between P1 and P2.

The relation between radio-wave strength Ns at P2 and radio-wave strength L2 at P1 and P3 can be expressed by a following formula (5) with the distance d1 between the position Pa of the router 310 and P2, and the distance d2 between the position P1 of the router 310 and P1, P3.

[Expression 5]

$$Ls - Ns = \left(\frac{4\pi d2}{\lambda}\right)^2 - \left(\frac{4\pi d1}{\lambda}\right)^2 \quad (5)$$

where "Ls" is radio-wave strength at P1, P3, "Ns" is radio-wave strength at P2, "λ" is radio wavelength, and "π" is pi.

The formula (3) described above is transformed into a following formula (6).

[Expression 6]

$$d2^2 - d1^2 = -d^2 + 2 \times d \times d2 \times \cos\theta \quad (6)$$

By substituting the formula (4) into the formula (6), a following formula (7) can be acquired.

[Expression 7]

$$d2^2 - d1^2 = -d^2 + d \times (D+d) = dD \quad (7)$$

By transforming the formula (5), a following formula (8) can be acquired.

[Expression 8]

$$d2^2 - d1^2 = (Ls - Ns) \times \left(\frac{\lambda}{4\pi}\right)^2 \quad (8)$$

By subtracting respective sides of the formula (7) and the formula (8), a following formula (9) can be acquired.

[Expression 9]

$$d = \frac{(Ls - Ns) \times \left(\frac{\lambda}{4\pi}\right)^2}{D} \quad (9)$$

By a following formula (10) acquired by substituting the formula (2) and the formula (9) into the formula (1), the transmittable data capacity A can be calculated.

[Expression 10]

$$A = \frac{s \times (Ls - Ns) \times \left(\frac{\lambda}{4\pi}\right)^2}{D \times V} \quad (10)$$

When communication between the Wi-Fi spot router 310 and the dashboard camera recorder 1 is established at P1, the communication control unit 14 stores the radio-wave strength (limit radio-wave strength) Ls and the radio-wave arrival direction θ recognized by the radio-wave strength recognition unit 13, and calculates the transmittable data capacity A by the formula (1) to the formula (10).

Note that "α" indicated in the settings table in FIG. 4 is a prescribed value for adjustment. In the settings table illustrated in FIG. 4, the communication control unit 14 may correct (increase/decrease) the numerical values of the ratios within the table for the amount of "α" defined based on the transmission required data capacity, may add the prescribed value α to the numerical values of the ratios within the table when the transmission required data capacity exceeds the prescribed value (or subtract the prescribed value α for the in-vehicle Wi-Fi relay communication), and may determine to execute which communication based on the transmission required data capacity, for example. Determining to execute which communication may be achieved by a method that designs the value α such that the ratio of transmission of the captured images becomes 100% under the condition C or other conditions or such that inversely the ratio of the in-vehicle Wi-Fi relay communication becomes 100% (in this case, "α" takes a minus value) under the condition D or other conditions as a result of correcting the values of the ratios.

Similarly, the communication control unit 14 may correct (increase/decrease) the numerical values of the ratios within the table for the amount of "α" defined based on the transmittable data capacity, may add the prescribed value α to the numerical values of the ratios within the table when the transmittable data capacity exceeds the prescribed value (or subtract the prescribed value α for the mobile body relay communication), and may determine to execute which communication based on the transmittable data capacity. Determining to execute which communication may be achieved by a method that designs the value α such that the ratio of transmission of the captured images becomes 100% under the condition C or other conditions or such that inversely the ratio of the in-vehicle Wi-Fi relay communication becomes 100% (in this case, "α" takes a minus value) under the condition D or other conditions as a result of correcting the values of the ratios.

Furthermore, the communication control unit 14 may determine the ratio, the correction value of the ratio, and which communication to execute based on a comparison between the transmittable data capacity and the transmission required data capacity. For example, when the transmittable data capacity is larger than the transmission required data capacity, the communication control unit 14 may determine to execute transmission of the captured images, may set the ratio values to have a higher ratio for transmission of captured images, or may set the prescribed value α to take a large value.

In next step S5, the communication control unit 14 integrates the data of captured images and the in-vehicle Wi-Fi data as described above by the ratio determined in Step S4 to reduce the total communication volume. This makes it possible to reduce the communication cost when transmitting the captured images. In subsequent Step S6, the communication control unit 14 transmits the data integrated in Step S5 to the external communication devices such as the image management server 510 and the information providing server 520 via the wide area network 500 to execute the captured image transmission processing and the in-vehicle Wi-Fi communication processing.

4. Another Embodiment

While the four-wheeled vehicle 100 is described in the embodiment above as the mobile body to which the dashboard camera recorder 1 is mounted, the mobile body to which the dashboard camera recorder 1 is mounted may also be a two-wheeled vehicle, a flying object, a boat, or the like.

In the embodiment described above, the speed recognition unit 12 and the radio-wave strength recognition unit 13 are provided, and the ratio between the communication volume to be allotted to transmission of the captured images and the communication volume to be allotted to the in-vehicle Wi-Fi communication is determined based on the traveling speed of the vehicle 100 and the radio-wave strength at the time of accessing the wide area network 500. As another embodiment, the ratio between the communication volume to be allotted to transmission of the captured images and the communication volume to be allotted to the in-vehicle Wi-Fi communication may be determined based on one of the traveling speed of the vehicle 100 and the radio-wave strength. Alternatively, the processing for determining the ratio between the communication volume to be allotted to transmission of the captured images and the communication volume to be allotted to the in-vehicle Wi-Fi communication based on the traveling speed of the vehicle 100 or the radio-wave strength may be omitted.

In the embodiment described above, the data of the captured images and the in-vehicle Wi-Fi data are integrated in accordance with the determined ratio of the communication volume to be allotted to transmission of the captured images and the communication volume to be allotted to the in-vehicle Wi-Fi communication (Step S5 of FIG. 3). In addition to or instead of that, the ratio of the communication volume (total volume) of the data of the captured images and the communication volume (total volume) of the data of the in-vehicle Wi-Fi transmitted in a plurality of times of communications within a prescribed unit time may be the ratio determined by the communication control unit 14.

While the cellular or Wi-Fi communication is used for accessing the wide area network (corresponds to a first communication network of the present disclosure) in the embodiment described above, it is also possible to use other communication schemes. Furthermore, while the in-vehicle Wi-Fi (corresponds to a second communication network of the present discloser) is used to perform communication between the mobile communication terminals 51, 52 used by the users U1, U2 of the vehicle 100 and the dashboard camera recorder 1, it is also possible to use other communication specifications such as Bluetooth (registered trademark).

While the case of configuring the communication system of the present disclosure with the dashboard camera recorder 1 is described in the embodiment above, the communication system of the present disclosure may also be configured with a communication terminal having a camera (a smartphone, a mobile phone, a tablet terminal, or the like), or the like.

Figure 2:
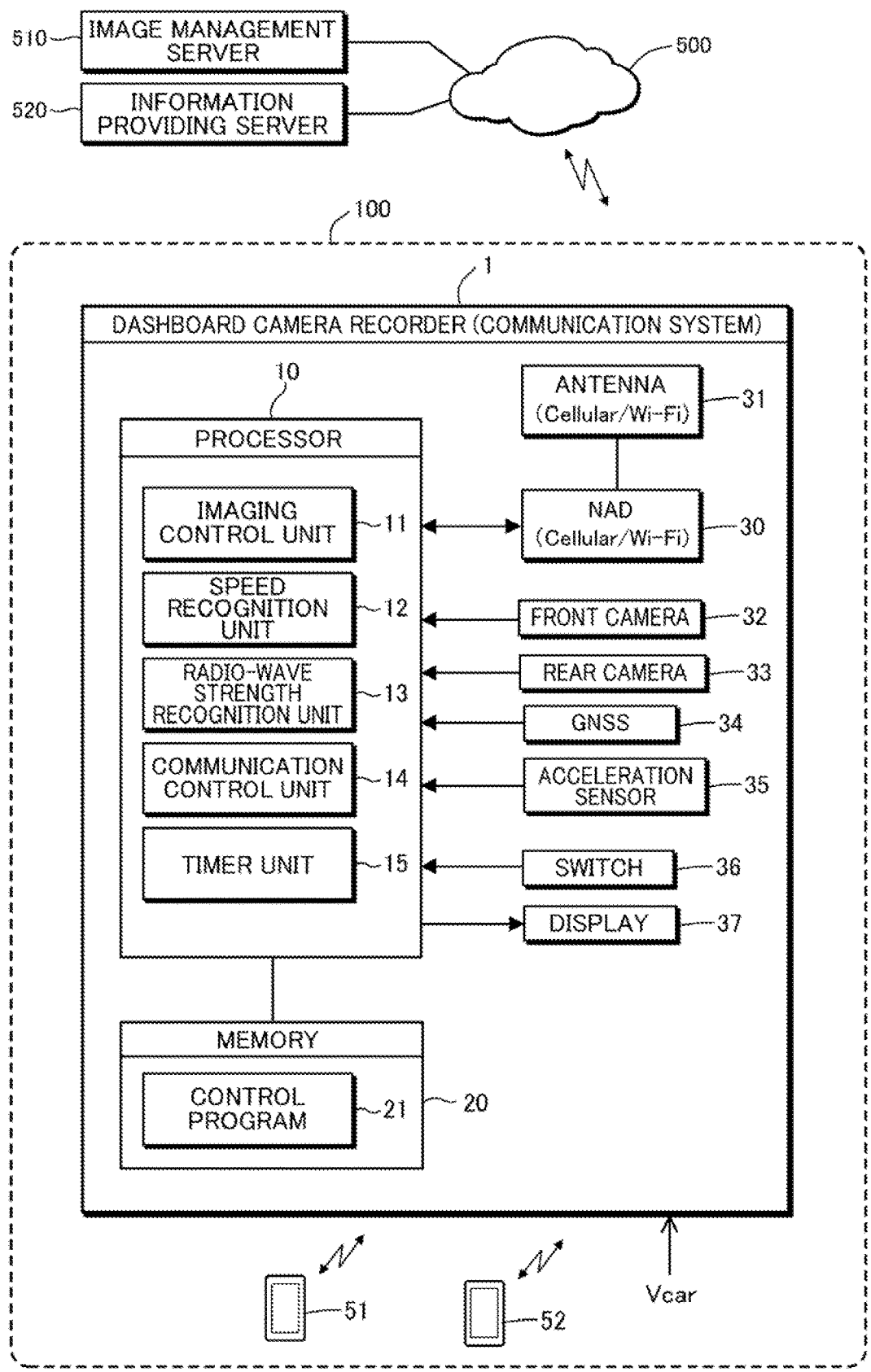
FIG. 2 is a block diagram of the dashboard camera recorder.

Note that FIG. 2 is a schematic diagram illustrating the configuration of the dashboard camera recorder 1 by sectioning it in accordance with the main processing contents in order to facilitate understanding of the present invention, and the configuration of the dashboard camera recorder 1 may also be formed by other sectioned blocks. Furthermore, the processing of each component may be executed by a single hardware unit or may be executed by a plurality of hardware units. Moreover, the processing of each component according to the flowchart illustrated in FIG. 3 may be executed by a single program or may be executed by a plurality of programs.

5. Configuration Supported by the Embodiments

The above-described embodiments support the following items.

(Item 1) A communication system including: a camera; an external communication unit configured to perform communication with an external communication device via a first communication network; a communication relay unit configured to perform communication with a mobile communication terminal via a second communication network to relay communication between the mobile communication terminal and the external communication device via the first communication network and the second communication network; and a communication control unit configured to execute captured image transmission processing for transmitting a captured image acquired by the camera to the external communication device by the external communication unit, and to execute mobile body relay processing for performing communication between the mobile communication terminal and the external communication device by the communication relay unit.

According to the communication system of item 1, the communication relay unit is provided, and communication between the mobile communication terminal and the external communication device and transmission of the captured image to the external communication device are executed collectively by a single communication grid by the external communication unit. This makes it possible to shrink overhead of communication control data with respect to the information data of the captured image and the like and reduce the communication cost when transmitting the captured image acquired by the mobile body to outside the mobile body.

(Item 2) The communication system according to item 1, further including a speed recognition unit configured to recognize a moving speed of a mobile body that uses the communication system, in which the communication control unit determines whether to execute transmission of the captured image by the captured image transmission processing or to execute communication by the mobile body communication relay processing based on the moving speed of the mobile body.

According to the communication system of item 2, it is possible to determine whether to execute transmission of the captured image by the captured image transmission processing or to execute communication by the mobile body communication relay processing based on the moving speed of the mobile body that affects the stability of the communication between the communication system and the external communication device.

(Item 3) The communication system according to item 1, further including a speed recognition unit configured to recognize a moving speed of a mobile body that uses the communication system, in which the communication control unit determines a ratio between a communication volume to be allotted to transmission of the captured image by the captured image transmission processing and a communication volume to be allotted to communication by the mobile body communication relay processing based on the moving speed of the mobile body.

According to the communication system of item 3, it is possible to determine the ratio to be allotted to transmission of the captured image based on the moving speed of the mobile body that affects the stability of the communication between the communication system and the external communication device.

(Item 4) The communication system according to item 3, in which the communication control unit decreases the ratio of the communication volume to be allotted to transmission of the captured image by the captured image transmission processing as the moving speed of the mobile body becomes faster.

According to the communication system of item 4, in a situation where the moving speed of the mobile body is fast and communication between the communication system and the external communication device is unstable, it is possible to suppress occurrence of transmission error of the captured image assumed to be of larger size than that of the communication data of the mobile communication terminal by decreasing the ratio of the communication volume to be allotted to transmission of the captured image.

(Item 5) The communication system according to any one of items 2 to 4, in which the speed recognition unit recognizes the moving speed of the mobile body by acquiring information of the moving speed of the mobile body detected by a speed sensor that is provided in the mobile body.

According to the communication system of item 5, it is possible to recognize the moving speed of the mobile body with high precision by using the information of the moving speed detected by the speed sensor that is provided in the mobile body.

(Item 6) The communication system according to any one of items 1 to 5, further including a radio-wave strength recognition unit configured to recognize a radio-wave strength in communication performed by the external communication unit via the first communication network, in which the communication control unit determines whether to execute transmission of the captured image by the captured image transmission processing or to execute communication by the mobile body communication relay processing based on the radio-wave strength.

According to the communication system of item 6, it is possible to determine whether to execute transmission of the captured image by the captured image transmission processing or to execute communication by the mobile body communication relay processing based on the radio-wave strength that affects the stability of the communication between the communication system and the external communication device.

(Item 7) The communication system according to any one of items 1 to 5, further including a radio-wave strength recognition unit configured to recognize a radio-wave strength in communication performed by the external communication unit via the first communication network, in which the communication control unit determines a ratio between a communication volume to be allotted to transmission of the captured image by the captured image transmission processing and a communication volume to be allotted to communication by the mobile body communication relay processing based on the radio-wave strength.

According to the communication system of item 7, it is possible to determine the ratio to be allotted to transmission of the captured image based on the radio-wave strength that affects the stability of the communication between the communication system and the external communication device.

(Item 8) The communication system according to item 7, in which the communication control unit decreases the ratio of the communication volume to be allotted to transmission of the captured image by the captured image transmission processing as the radio-wave strength becomes weaker.

According to the communication system of item 8, in a situation where the radio-wave strength is weak and communication between the communication system and the external communication device is unstable, it is possible to suppress occurrence of transmission error of the captured image assumed to be of larger size than that of the communication data of the mobile communication terminal by decreasing the ratio of the communication volume to be allotted to transmission of the captured image.

(Item 9) The communication system according to any one of items 1 to 5, in which the external communication unit performs communication with the external communication device via the first communication network by packet communication, and the communication control unit packetizes data that is a combination of data of the captured image transmitted by the captured image transmission processing and data transmitted by the mobile body communication relay processing, and transmits the packetized data to the external communication device by the packet communication by the external communication unit to execute the captured image transmission processing and the mobile body communication relay processing.

According to the communication system of item 9, by packetizing the data that is a combination of the data of the captured image transmitted by the captured image transmission processing and the data transmitted by the mobile body communication relay processing, it is possible to decrease the ratio of the control data with respect to the information data of the captured image and the like in the packet and reduce the transmission cost of the captured image.

(Item 10) The communication system according to item 3 or 4, in which the external communication unit performs communication with the external communication device via the first communication network by packet communication, and the communication control unit packetizes data that is a combination of data of the captured image transmitted by the captured image transmission processing and data transmitted by the mobile body communication relay processing in accordance with the ratio determined based on the moving speed of the mobile body, and transmits the packetized data to the external communication device by the packet communication by the external communication unit to execute the captured image transmission processing and the mobile body communication relay processing.

According to the communication system of item 10, by packetizing the data that is a combination of the data of the captured image transmitted by the captured image transmission processing and the data transmitted by the mobile body communication relay processing in accordance with the ratio determined based on the moving speed of the mobile body, it is possible to decrease the ratio of the control data with respect to the information data of the captured image and the like in the packet and reduce the transmission cost of the captured image.

(Item 11) The communication system according to item 7 or 8, in which the external communication unit performs communication with the external communication device via the first communication network by packet communication, and the communication control unit packetizes data that is a combination of data of the captured image transmitted by the captured image transmission processing and data transmitted by the mobile body communication relay processing in accordance with the ratio determined based on the radio-wave strength, and transmits the packetized data to the external communication device by the packet communication by the external communication unit to execute the captured image transmission processing and the mobile body communication relay processing.

According to the communication system of item 11, by packetizing the data that is a combination of the data of the captured image transmitted by the captured image transmission processing and the data transmitted by the mobile body communication relay processing in accordance with the ratio determined based on the radio-wave strength, it is possible to decrease the ratio of the control data with respect to the information data of the captured image and the like in the packet and reduce the transmission cost of the captured image.

(Item 12) The communication system according to any one of items 1 to 9, which is formed with a dashboard camera recorder that includes the camera configured to capture at least one of surroundings or inside of a mobile body, the dashboard camera recorder being mounted to the mobile body to be used.

According to the communication system of item 12, it is possible to form the communication system of the present disclosure by expanding the function of the dashboard camera recorder used by being mounted to the mobile body.

(item 13) A communication method to be performed by a computer, the method comprising: transmitting a captured image acquired by a camera to an external communication device by an external communication unit configured to perform communication with the external communication device via a first communication network; and performing communication between a mobile communication terminal and the external communication device by a communication relay unit configured to perform communication with the mobile communication terminal via a second communication network to relay communication between the mobile communication terminal and the external communication device via the first communication network and the second communication network.

By causing the computer to execute the communication method of the item 13, the components of the communication system of the item 1 can be implemented.

REFERENCE SIGNS LIST

1 Dashboard camera recorder
10 Processor
11 Imaging control unit
12 Speed recognition unit
13 Radio-wave strength recognition unit
14 Communication control unit
15 Timer unit
20 Memory
30 NAD
31 Antenna
32 Front camera
33 Rear camera
34 GNSS
35 Acceleration sensor
36 Switch
37 Display
51, 52 Mobile communication terminal
100 Vehicle (mobile body)
300 Cellular communication base station
310 Wi-Fi spot router
500 Wide area network
510 Image management server
520 Information providing server
U1, U2 User

What is claimed is:

1. A communication system comprising:
    a camera;
    an external communication unit that is a first antenna configured to perform communication with an external communication device via a first communication network;
    a communication relay unit that is a second antenna configured to perform communication with a mobile communication terminal via a second communication network to relay communication between the mobile communication terminal and the external communication device via the first communication network and the second communication network; and
    a processor,
    wherein the processor includes:
        a communication control unit configured to execute captured image transmission processing for transmitting a captured image acquired by the camera to the external communication device by the external communication unit, and to execute mobile body relay processing for performing communication between the mobile communication terminal and the external communication device by the communication relay unit; and
        a speed recognition unit configured to recognize a moving speed of a mobile body that uses the communication system, and
    wherein the communication control unit determines whether to execute transmission of the captured image by the captured image transmission processing or to execute communication by the mobile body communication relay processing based on the moving speed of the mobile body.

2. The communication system according to claim 1, wherein
    the communication control unit determines a ratio between a communication volume to be allotted to transmission of the captured image by the captured image transmission processing and a communication volume to be allotted to communication by the mobile body communication relay processing based on the moving speed of the mobile body.

3. The communication system according to claim 2, wherein the communication control unit decreases the ratio of the communication volume to be allotted to transmission of the captured image by the captured image transmission processing as the moving speed of the mobile body becomes faster.

4. The communication system according to claim 2, wherein
the external communication unit performs communication with the external communication device via the first communication network by packet communication, and
the communication control unit packetizes data that is a combination of data of the captured image transmitted by the captured image transmission processing and data transmitted by the mobile body communication relay processing in accordance with the ratio determined based on the moving speed of the mobile body, and transmits the packetized data to the external communication device by the packet communication by the external communication unit to execute the captured image transmission processing and the mobile body communication relay processing.

5. The communication system according to claim 1, wherein the speed recognition unit recognizes the moving speed of the mobile body by acquiring information of the moving speed of the mobile body detected by a speed sensor that is provided in the mobile body.

6. The communication system according to claim 1, wherein the processor further includes a radio-wave strength recognition unit configured to recognize a radio-wave strength in communication performed by the external communication unit via the first communication network, and
the communication control unit determines whether to execute transmission of the captured image by the captured image transmission processing or to execute communication by the mobile body communication relay processing based on the radio-wave strength.

7. The communication system according to claim 1, wherein the processor further includes a radio-wave strength recognition unit configured to recognize a radio-wave strength in communication performed by the external communication unit via the first communication network, and
the communication control unit determines a ratio between a communication volume to be allotted to transmission of the captured image by the captured image transmission processing and a communication volume to be allotted to communication by the mobile body communication relay processing based on the radio-wave strength.

8. The communication system according to claim 7, wherein the communication control unit decreases the ratio of the communication volume to be allotted to transmission of the captured image by the captured image transmission processing as the radio-wave strength becomes weaker.

9. The communication system according to claim 7, wherein
the external communication unit performs communication with the external communication device via the first communication network by packet communication, and
the communication control unit packetizes data that is a combination of data of the captured image transmitted by the captured image transmission processing and data transmitted by the mobile body communication relay processing in accordance with the ratio determined based on the radio-wave strength, and transmits the packetized data to the external communication device by the packet communication by the external communication unit to execute the captured image transmission processing and the mobile body communication relay processing.

10. The communication system according to claim 1, wherein
the external communication unit performs communication with the external communication device via the first communication network by packet communication, and
the communication control unit packetizes data that is a combination of data of the captured image transmitted by the captured image transmission processing and data transmitted by the mobile body communication relay processing, and transmits the packetized data to the external communication device by the packet communication by the external communication unit to execute the captured image transmission processing and the mobile body communication relay processing.

11. The communication system according to claim 1, comprising a dashboard camera recorder that includes the camera configured to capture at least one of surroundings or inside of a mobile body, the dashboard camera recorder being mounted to the mobile body to be used.

12. A communication method to be performed by a computer, the method comprising:
transmitting a captured image acquired by a camera to an external communication device by an external communication unit that is a first antenna configured to perform communication with the external communication device via a first communication network;
performing communication between a mobile communication terminal and the external communication device by a communication relay unit that is a second antenna configured to perform communication with the mobile communication terminal via a second communication network to relay communication between the mobile communication terminal and the external communication device via the first communication network and the second communication network;
recognizing a moving speed of a mobile body that uses the communication system; and
determining whether to execute transmission of the captured image or to execute communication based on the moving speed of the mobile body.

13. A communication method to be performed by a computer, the method comprising:
transmitting a captured image acquired by a camera to an external communication device by an external communication unit that is a first antenna configured to perform communication with the external communication device via a first communication network;
performing communication between a mobile communication terminal and the external communication device by a communication relay unit that is a second antenna configured to perform communication with the mobile communication terminal via a second communication network to relay communication between the mobile communication terminal and the external communication device via the first communication network and the second communication network;
recognizing a moving speed of a mobile body that uses the communication system; and
determining a ratio between a communication volume to be allotted to transmission of the captured image and a communication volume to be allotted to communication based on the moving speed of the mobile body.

\* \* \* \* \*